(12) United States Patent
Park (10) Patent No.: US 6,839,553 B2
(45) Date of Patent: Jan. 4, 2005

(54) METHOD OF MANAGING MOBILE STATION OPERATIONAL PARAMETERS

(75) Inventor: Hyoung Sun Park, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 286 days.

(21) Appl. No.: 10/102,969

(22) Filed: Mar. 22, 2002

(65) Prior Publication Data

US 2002/0102964 A1 Aug. 1, 2002

Related U.S. Application Data

(63) Continuation of application No. 09/436,726, filed on Nov. 9, 1999.

(30) Foreign Application Priority Data

Mar. 3, 1999 (KR) .......................................... 1999-6891

(51) Int. Cl.[7] .............................................. H04M 1/66
(52) U.S. Cl. ...................... 455/411; 455/410; 455/418; 455/560; 380/247
(58) Field of Search ................................ 455/411, 410, 455/414, 418, 419, 420, 433, 515, 550, 560; 380/247, 270

(56) References Cited

U.S. PATENT DOCUMENTS

| | | | |
|---|---|---|---|
| 5,148,007 A | 9/1992 | Kruse .......................... 235/382 |
| 5,282,250 A | 1/1994 | Dent et al. ..................... 380/23 |
| 5,299,263 A | 3/1994 | Beller et al. ................... 380/30 |
| 5,991,405 A * | 11/1999 | Mills ........................... 380/247 |
| 5,995,829 A | 11/1999 | Broderick ..................... 455/418 |
| 6,029,065 A | 2/2000 | Shah ........................... 455/414 |
| 6,047,071 A | 4/2000 | Shah ........................... 380/273 |
| 6,122,503 A | 9/2000 | Daly ........................... 455/419 |
| 6,141,544 A * | 10/2000 | Corriveau et al. ........... 455/411 |
| 6,160,875 A | 12/2000 | Park et al. .................... 379/133 |
| 6,195,546 B1 | 2/2001 | Leung et al. ................ 455/419 |
| 6,195,547 B1 * | 2/2001 | Corriveau et al. ........... 455/419 |
| 6,236,852 B1 * | 5/2001 | Veerasamy et al. ......... 455/411 |
| 6,243,811 B1 * | 6/2001 | Patel ........................... 713/167 |
| 6,587,685 B2 * | 7/2003 | Mittal et al. ................. 455/419 |
| 6,591,364 B1 * | 7/2003 | Patel ........................... 713/170 |

FOREIGN PATENT DOCUMENTS

| | | | | |
|---|---|---|---|---|
| EP | 1001570 A2 * | 5/2000 | ............. H04L/9/32 |
| WO | WO 9841044 A2 | 9/1998 | |
| WO | WO 98/41044 | 9/1998 | |

* cited by examiner

*Primary Examiner*—Congvan Tran
(74) *Attorney, Agent, or Firm*—Fleshner & Kim, LLP (57) ABSTRACT

A method of managing mobile station operational parameters is disclosed in which a mutual authentication between a mobile station and a network is performed. The present method allows a mutual authentication while maintaining the updating procedure of the mobile station operational parameters in the conventional procedure.

18 Claims, 5 Drawing Sheets

METHOD OF MANAGING MOBILE STATION OPERATIONAL PARAMETERS

This is a continuation of application No. 09/436,726, filed Nov. 9, 1999.

BACKGROUND OF THE INVENTION

1. Field of the Invention

This invention relates to a mobile communication system and more particularly to a method of managing mobile station operational parameters in the mobile communication system. In the present invention, the mobile station operational parameters are managed such that a mutual authentication between a mobile station and a network can be performed while maintaining the same number of operational parameter updating.

2. Background of the Related Art

Mobile communication networks based on cellular or personal communication system (PCS) have been expanding due to the rapid development in the information and communication field. Accordingly, various functions of the mobile communication networks have been continuously upgraded to provide a more convenient communication service to subscribers.

To upgrade specific functions on the network, a network manager must change both programs and operational parameters installed in communication apparatus such as a base station (BS), a base station controller (BSC), a mobile switching center (MSC), a home/visitor location register (HLR/VLR), and authentication center (AC). Moreover, the network manager must also change specific parameters in each mobile stations. However, to change specific parameters in a mobile station, the mobile station must be either physically connected to a system enabled to change such parameters or a user must manually and appropriately operate the keypad of the mobile station.

Therefore, a technology which allows changing of specific parameters of the mobile station by wireless communication has been developed, known as the Over-The-Air Parameter Administration (OTAPA). The OTAPA is disclosed in IS-725-A, pp. 3–75 to 3–78, Apr. 13, 1999 or the PCT application No. WO 98/41044 by Northern Telecom Inc., fully incorporated herein.

According to the IS-725-A, an authentication procedure for a communication network is included in the OTAPA process such that a mobile station may confirm whether the network is correct, but an authentication procedure for a mobile station is not included. As a result, a person may illegally change the specific parameters of a mobile station and receive illegal communication service, thereby affecting the overall service to the authorized users, i.e. mobile stations, of a network. Therefore, the reliability of the management system for authorized users of a network may be dropped, and the quality of service may also decline.

Although the network may first perform an authentication procedure of a mobile stations before the OTAPA process, if the authentication procedure of the mobile station is performed independently, the entire OTAPA process will be elongated. Moreover, a separate authentication procedure must be added, thereby increasing the load in a communication network.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, an object of the present invention is to solve at least the problems and disadvantages of the related art.

An object of the present invention is to allow a management which can perform a mutual authentication between a mobile station and a network.

A further object of the present invention is to allow a management which can perform a mutual authentication between a mobile station and a network while maintaining the same number of mobile station operational parameter updating procedure as in the conventional procedure.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of managing mobile station operational parameters in a wireless communication network comprises the notifying a mobile station that an update of the mobile station operational parameters has been initiated upon an update request from the network; performing a mutual authentication procedure between the mobile station and a network; transmitting from the network, at least one mobile station operational parameter to the mobile station; and receiving and updating the corresponding mobile station operational parameters at the mobile station.

The mutual authentication may further comprise generating and transmitting from the network, a first random number to the mobile station, and generating a first authentication signature utilizing the first random number; generating at the mobile station, a second authentication signature utilizing the first random number and a second random number, and transmitting to the network the second random number with the second authentication signature, and then generating a third authentication signature utilizing the second random number; comparing at the network, the second authentication signature with the first authentication signature and authenticating the mobile station; generating at the network, a fourth authentication signature unitizing the second random number when the first authentication signature and the second authentication signature are equivalent, and transmitting the fourth authentication signature to the mobile station; comparing at the mobile station, the third authentication signature with the fourth authentication signature and authenticating the network in accordance with the results of the comparison.

Also, the mutual authentication may further comprise generating and transmitting, at the mobile station, a third random number to the network, and generating a fifth authentication signature utilizing the third random number; generating, at the network, a sixth authentication signature utilizing the third random number and a fourth random number, and transmitting the fourth random number with the sixth authentication signature to the mobile station, and then generating a seventh authentication signature utilizing the fourth random number; comparing, at the mobile station, the fifth authentication signature with the sixth authentication signature and authenticating, at the mobile station, the network in accordance with the comparison result; generating, at the mobile station, an eighth authentication signature unitizing the fourth random number when the fifth authentication signature and the sixth authentication signation signature to the network; comparing, at the network, the seventh authentication signature with the eighth authentication signature and authenticating the mobile station in accordance with the comparison results.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

To perform OTAPA, various functions are implemented in each mobile station and each element of a wireless communication network.

Both a mobile station and a network must have a capacity to internally generate a random number when necessary, and must store a secret key (A_KEY) as well as a shared secret data (SSD). The A_KEY is a 64 bit pattern stored in a mobile station and in an authentication center (AC). It is used to generate or update the mobile station's SSD. The SSD is a 128 bit pattern stored in the mobile station and is known by an AC. Also, the HLR must know that each mobile station supports the OTAPA function.

The OTAPA procedure can generally be divided into four parts. First, the network notifies a mobile station the start of a mobile station operational parameter update in response to a user's request through the mobile station by a manual operation of the pad on the mobile station, a user's request through the network, or in response to the network during specific states of either the mobile stations or the network. In the present invention, the network encompasses the elements between a mobile switching center and an authentication center (AC).

Second, the mutual authentication procedure between the mobile station and the network is performed. In the authentication procedure, the network may first authenticate the mobile station and then the mobile station may authenticate the network; or the mobile station may first authenticate the network and then the network may authenticate the mobile station.

Figure 1:
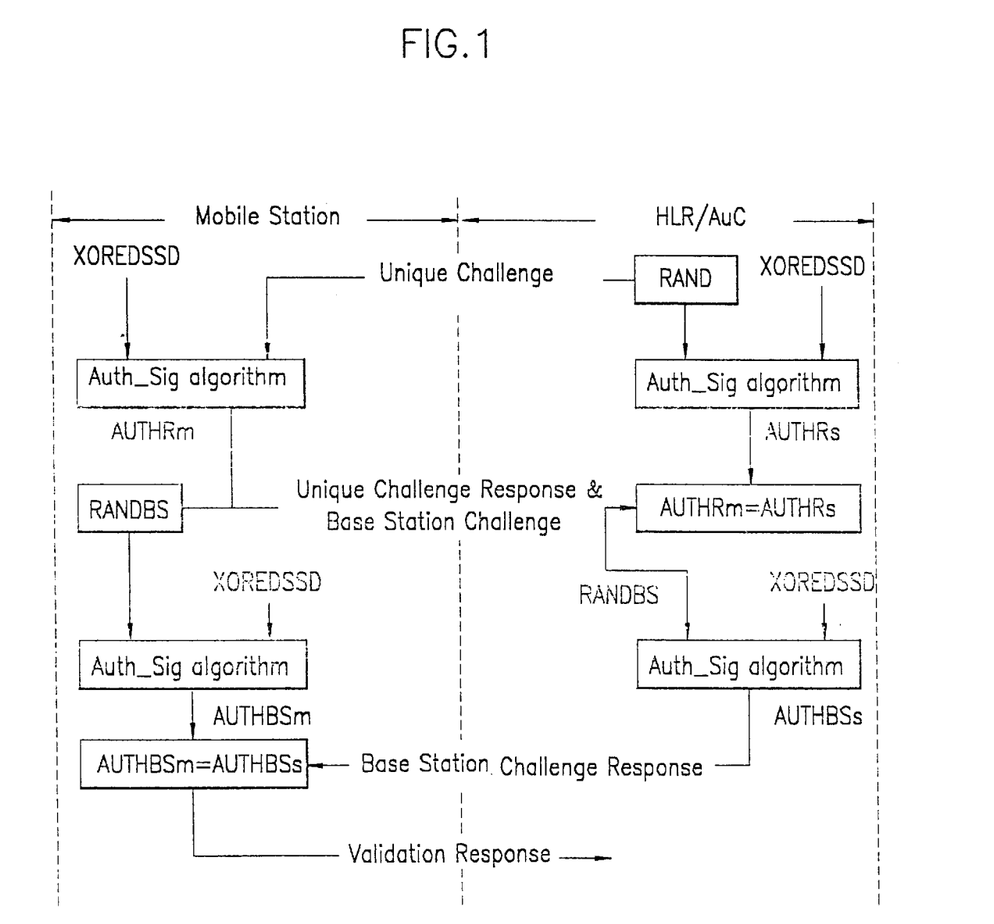
FIGS. 1 and 2 are time sequence diagrams explaining a mutual authentication procedure between a mobile station and a network according to a first embodiment of the present invention.
Figure 2:
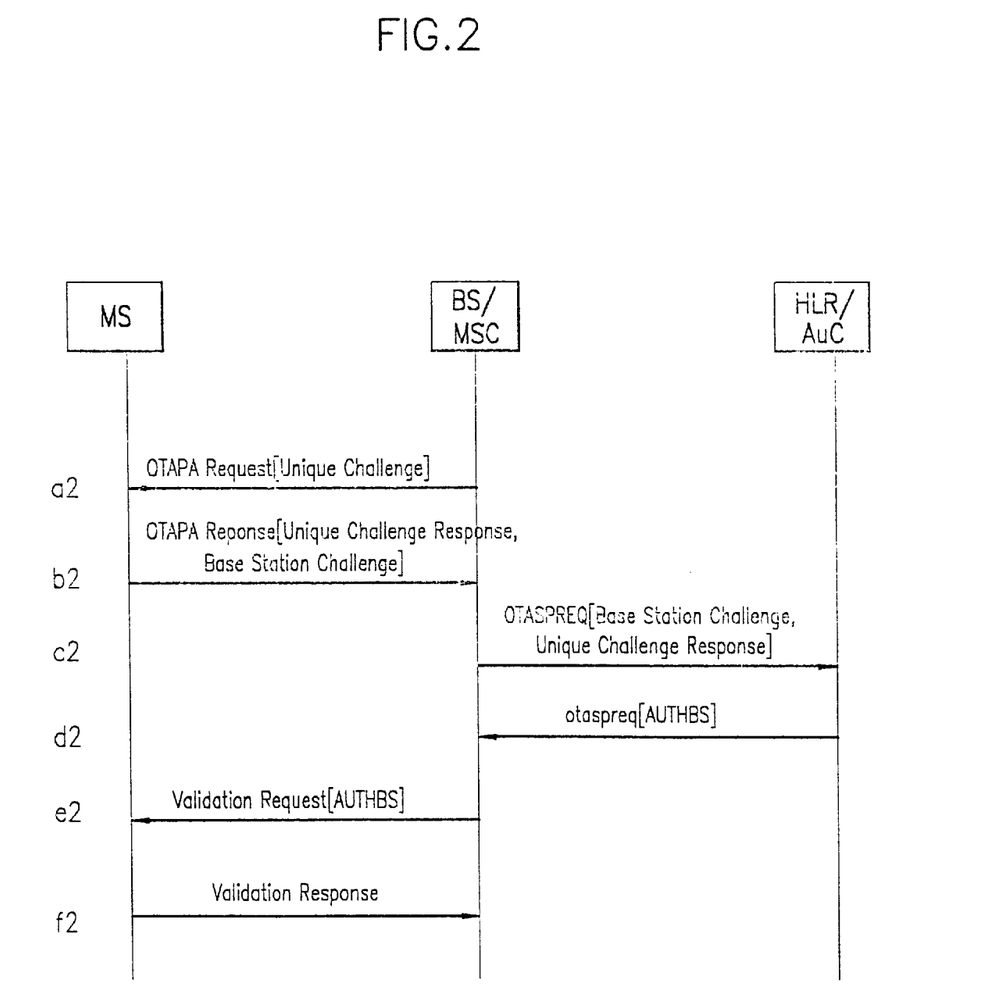

FIGS. 1 and 2 explain a first embodiment of the mutual authentication procedure in which the network authenticates the mobile station prior to the mobile station authentication of the network.

Referring to FIGS. 1 and 2, the network generates a first random number RAND and requests a unique challenge order from a mobile station MS using OTAPA Request message as shown in a2 of FIG. 2. A message notifying the initiation of the mobile station operational parameters update may be included in the OTAPA message. Also, the network generates a first authentication signature AUTHRs utilizing the first RAND.

The mobile station MS receives the first RAND from the network and generates a second authentication signature AUTHRm utilizing the first RAND. The mobile station further generates and transmits to the network a second random number RANDBS with the second AUTHRm. Thus, the mobile station MS generates a unique challenge response and requests a base station challenge order to a HLR/AC through a base station BS/MSC/OTAf of the network utilizing the OTAPA response as shown in b2 and c2 of FIG. 2. Thereafter, the mobile station MS generates a third authentication signature AUTHBSm utilizing the second RANDBS.

In the above case, the third authentication signature AUTHBSm is generated after transmitting the second random number RANDBS and the second authentication signature AUTHRm. However, the mobile station may generate the third authentication signature AUTHBSm prior to the transmission of the second random number RANDBS and the second authentication signature AUTHRm.

After receiving the transmission from the mobile station MS, the HLR/AC of the network compares the second AUTHRm with the first AUTHRs generated in the network. If the first AUTHRs and the second AUTHRm are equivalent, the network generates a fourth authentication signature AUTHBSs utilizing the second RANDBS and transmits the fourth authentication signature AUTHBSs to the mobile station MS through a validation request as shown in e2 of FIG. 2. Here, the network may first generate the fourth authentication signature AUTHBSs and then transmit the fourth AUTHBSs depending upon the comparison.

The mobile station MS receives the fourth AUTHBSs from the network and compares the third AUTHBSm with the fourth AUTHBSs. If the two authentication signatures AUTHBSm and AUTHBSs are equivalent, the mobile station MS forwards to the network a message indicating that a mutual authentication was successfully performed through a validation response as shown in f2 of FIG. 2.

In the above described mutual authentication procedure, the mobile station may generate the first authentication signature. In such case, the network would generate and store the first random number RAND, and transmit the first random number RAND to the mobile station MS. When the first random number RAND is received, the mobile station MS would generate the first authentication signature utilizing the first random number RAND transmitted by the network, and generate and transmits the second random number RANDBS with the first authentication signature to the network. The mobile station MS would next generate the second authentication signature utilizing the second random number RANDBS.

Thus, the network would generate the third authentication signature utilizing the first RAND and compare the first authentication signature with the third authentication signature to authenticate the mobile station MS. If the first and third authentication signatures are equivalent, the network would generate the fourth authentication signature utilizing the second random number RANDBS and transmit the fourth authentication signature to the mobile station MS.

In the above cases, the mobile station may generate the second authentication signature prior to the transmission of the second random number RANDBS and the first authentication signature. Also, the network may first generate the fourth authentication signature and then transmit the fourth authentication signature depending upon the result of the comparison.

Therefore, the mobile station MS would authenticate the network by comparing the fourth and the second authentication signatures, and if the mutual authentication is successfully performed, the network transmits the necessary parameter value(s) to the mobile station MS. Finally, the mobile station MS receives the parameter values and updates the old parameter(s).

Figure 3:
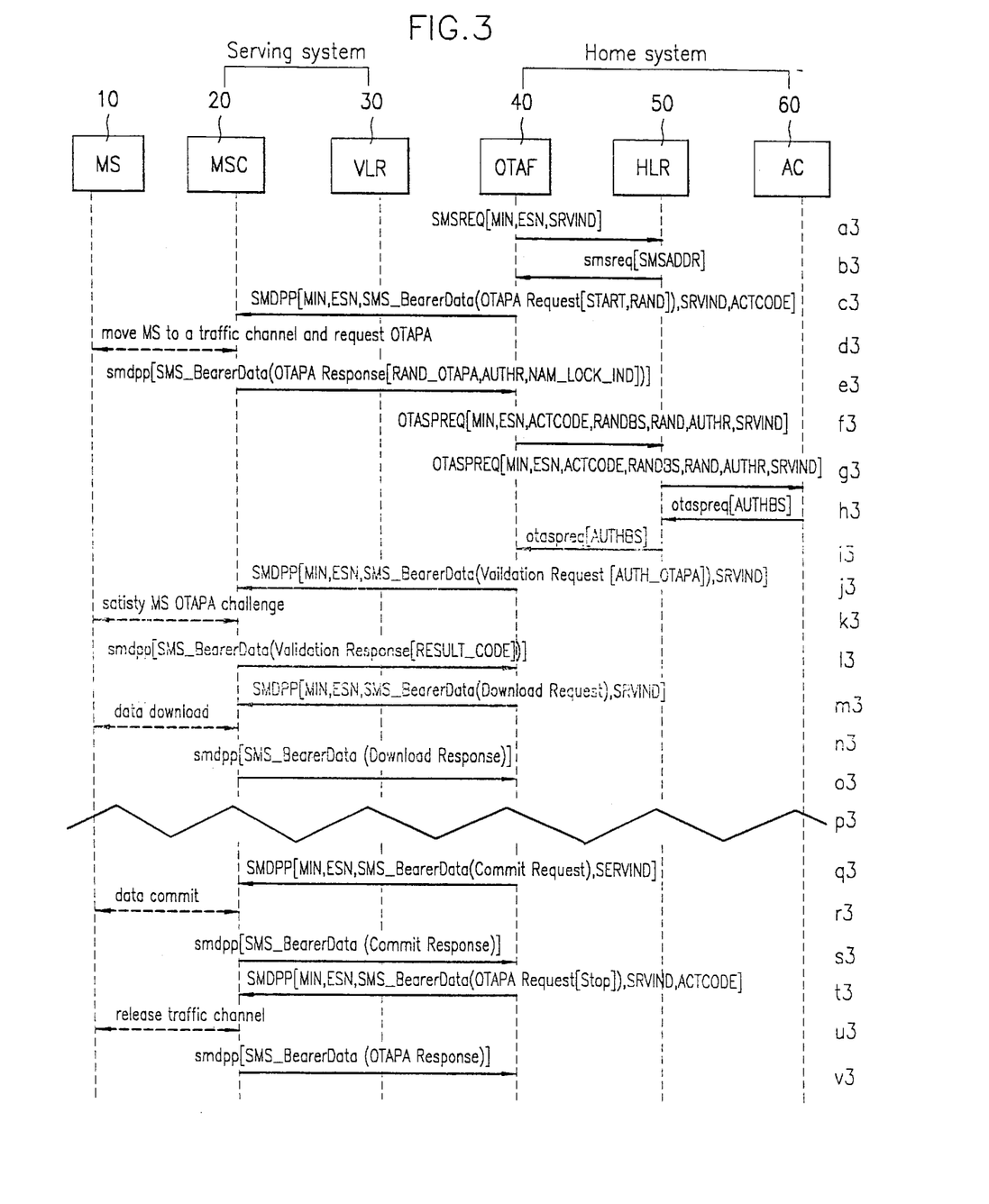
FIG. 3 is a time sequence diagram explaining the detailed OTAPA process according to a first embodiment of the present invention.

FIG. 3 is a sample time sequence diagram explaining the OTAPA process according to an embodiment in which the mobile station generates the first authentication signature. Referring to FIG. 3, when operational parameter(s) of a mobile station MS 10 requires a change due to a user's request through the MS 10 or the network, or due to specific states of either the MS 10 or the network, an Over-the-Air Service Provisioning Function (OTAF) 40 of the network queries the HLR 50 to determine the MS' 10 availability for the OTAPA, as shown in a3 and b3 of FIG. 3.

The SMSRequest (SMSREQ) is utilized either in an operation requesting a Short Message Service (SMS) of the mobile station MS 10 or in the OTAPA procedure requesting a location information for the OTAPA functions in accordance with the present invention. The Service Indicator (SRVIND) is utilized to determine the service options as OTA Service Provisioning (OTASP) or OTAPA. Also, the smsreq is the response message for the SMSREQ. Generally, messages indicating an initiation of an operation is denoted by capital letters, while messages indicating a response to the operation is expressed in small letters.

If the MS 10 is OTAPA capable, the OTAF 40 generates and stores a random number RAND to be used in the authentication process. The OTAF 40 also notifies the start of the OTAPA procedure to the MS 10 through a message shown in c3. Particularly, the OTAF 40 transmits the random number RAND with the message SMSDelivery Point To Point (SMDPP).

The SMDPP is utilized in the transmission of the short message in SMS and in the transmission of messages between the MS 10 and the OTAF 40 as defined in IS-683-A. The ActionCode (ACTCODE) is a parameter utilized in the determination of the contents for update and the SMS_BearerData is a parameter for transmitting messages between the MS 10 and the OTAF 40.

Subsequently, the MS 10 receives the random number RAND from the OTAF 40 and generates a XOREDSSD by a XOR operation using the shared secret data SSD and the secret key A_KEY. The MS 10 generates an authentication signature AUTHR utilizing the XOREDSSD, the received RAND and also utilizing a Mobile Identification Number (MIN) and an Electric Serial Number (ESN), already stored therein. The MS 10 then generates a new random number RAND_OTAPA to be used for authenticating the network and generates a new authentication signature AUTH_OTAPA utilizing the RAND_OTAPA, the XOREDSSD, the MIN and the ESN.

Particularly, the AUTHR is obtained by performing an authentication algorithm utilizing the secret key A_KEY, the random number RAND and the MIN stored in the MS 10. If the network were to generate the first authentication signature, the first authentication signature would be obtained by performing an authentication algorithm utilizing the secret key A_KEY, the random number RAND and the MIN stored in the AC 60. Here, the MIN is a 40 bit number and is a digital representation of the 10 digit number assigned to a mobile station. The ESN is a 32 bit number assigned by the mobile station manufacturer to uniquely identify the mobile station equipment.

Thus, the MS 10 transmits to the OTAF 40 a response message with the random number RAND_OTAPA and the authentication signature AUTHR generated using the random number RAND from the OTAF 40, shown in e3 of FIG. 3. Here, the smdpp is a response message of the SMDPP message, the RAND_OTAPA (Random OTAPA) is a random number, and a NAM Lock Indicator (NAM_LOCK_IND) is a parameter indicating whether an update of parameter(s) is protected.

Subsequently, the OTAF 40 receives the OTAPA response message transmitted from the MS 10. If the OTAF 40 determines that the NAM is protected, the OTAF 40 initiates the authentication procedure by converting the received random number RAND_OTAPA into a random number RANDBS. The OTAF 40 then transmits to the AC 60 the random number RANDBS, the authentication signature AUTHR and the random number RAND as shown in f3 and g3. The OTASPREQ is a parameter utilized by the OTAF 40 to initiate the authentication procedure.

After receiving the random numbers RAND and RANDBS with the authentication signature AUTHR, the AC 60 again generates the authentication signature AUTHR using the random number RAND, XOREDSSD, MIN, and ESN by the same algorithm as described with reference to the MS 10. Accordingly, the AC 60 compares the internally generated authentication signature AUTHR with the authentication signature AUTHR received from the MS 10. If the two authentication signatures are equivalent, the AC 60 generates and transmits to the OTAF 40 the fourth authentication signature AUTHBS with the generated XOREDSSD, MIN, ESN and received the RANDBS as shown in h3 and i3.

The authentication signature AUTHBS utilized in the network is then converted into the authentication signature AUTH_OTAPA, a format for transmission or reception between the MS 10 and the OTAF 40. Thus, the OTAF 40 receives the authentication signature AUTHBS from the AC 60 in a message shown in h3 and j3, and converts the authentication signature AUTHBS into the authentication signature AUTH_OTAPA. The converted authentication signature AUTH_OTAPA is transmitted to the MS 10.

Receiving the authentication signature AUTH_OTAPA from the OTAF 40, the MS 10 compares the received authentication signature AUTH_OTAPA with the internally generated authentication signature AUTH_OTAPA. If the two authentication signatures AUTH_OTAPA are equivalent, the MS 10 recognizes that the mutual authentication between the MS 10 and the network is successfully performed. Accordingly, the MS 10 transmits to the OTAF 40 a message allowing the parameter update procedure as shown in 13.

Thereafter, the OTAF 40 transmits to the MS 10 the necessary parameters as shown in m3 to o3, and if appropriate also transmits an instruction message to store the parameters, shown in q3. Upon receiving the storage instructions from the OTAF 40, the MS 10 updates or changes the old parameters with the newly received parameters and transmits to the OTAF 40 a message indicating a successful parameter update, shown in r3 and s3. Finally, the OTAF 40 transmits to the MS 10 a message indicating a completion of the entire authentication procedure, shown in t3 to v3.

Figure 4:
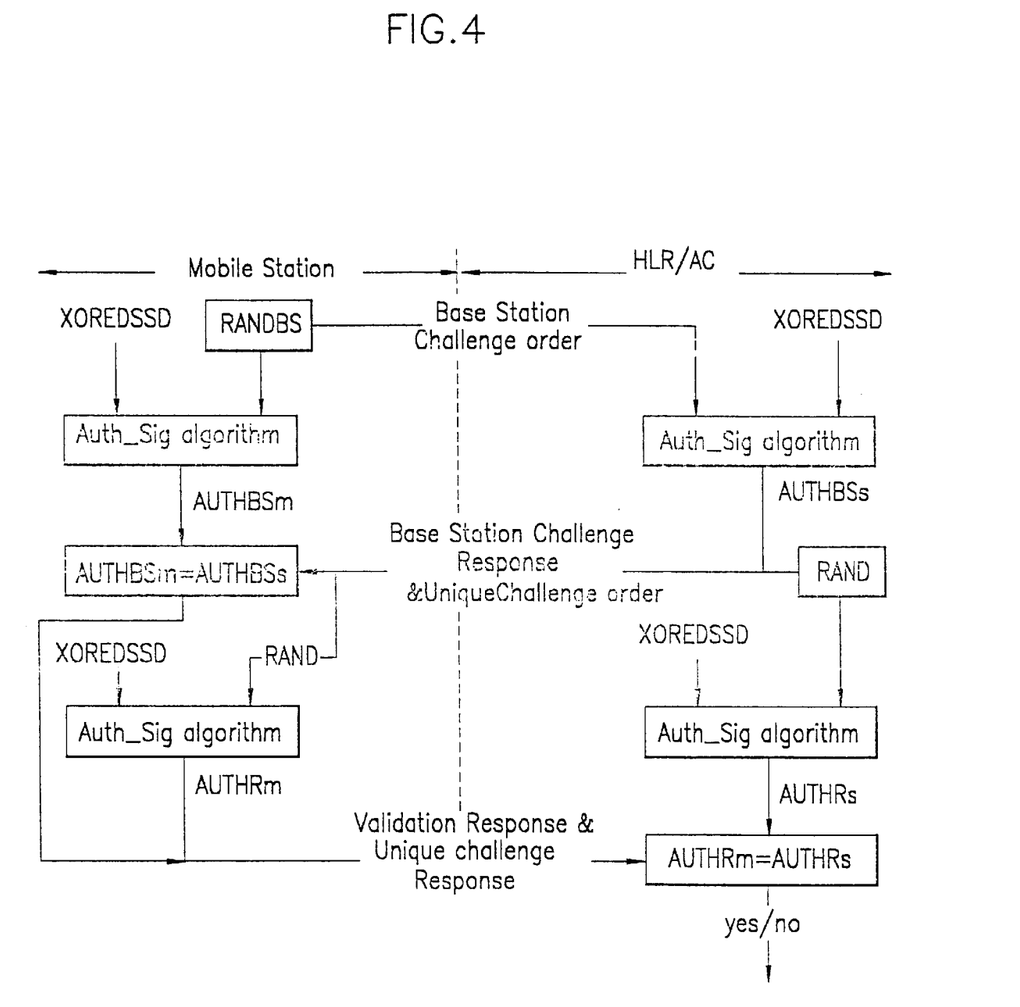
FIGS. 4 and 5 are time sequence diagrams explaining a mutual authentication procedure between a mobile station and a network according to a second embodiment of the present invention.
Figure 5:
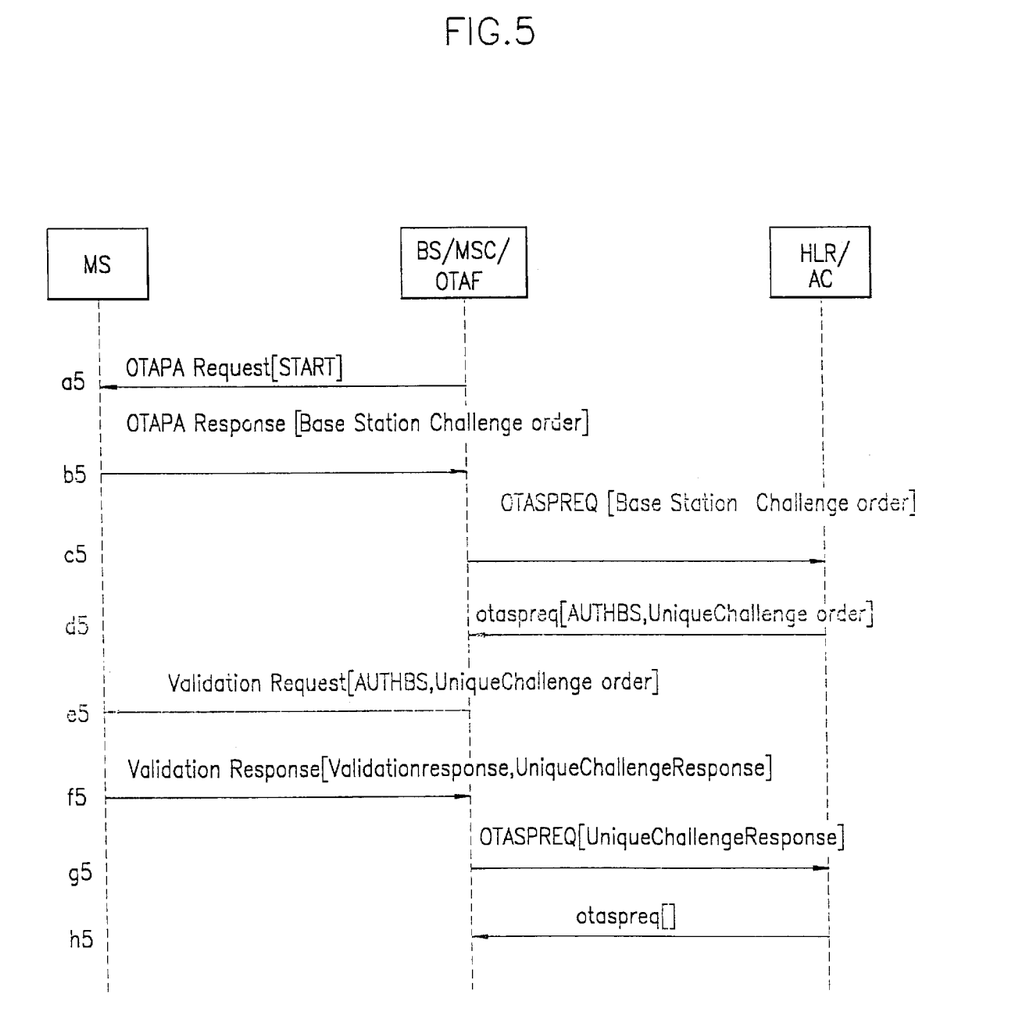

FIGS. 4 and 5 illustrate time sequence diagrams explaining a mutual authentication procedure between a mobile station and a network according to a second embodiment of the present invention.

Referring to FIGS. 4 and 5, the network transmits to a mobile station MS a message notifying the initiation of OTAPA as shown in a5 of FIG. 5. The message notifying the OTAPA initiation may be included in the OTAPA Request message. Receiving the message, the mobile station MS generates a first random number RANDBS and generates a first authentication signature AUTHBSm utilizing the random number RANDBS. The mobile station MS also transmits to the network the random number RANDBS through OTAPA response as shown in b5 and c5 of FIG. 5.

The network receives the random number RANDBS and generates a second authentication signature AUTHBSs using the random number RANDBS. The network further generates a random number RAND to be used in the authentication of the mobile station MS, and generates a third authentication signature AUTHRs utilizing the random number RAND. The network then transmits to the mobile station MS the generated authentication signature AUTHBSs with the random number RAND as shown in d5 and e5 of FIG. 5. As in the first embodiment of the present invention, the third authentication signature AUTHRs may be generated either before or after transmitting the second authentication signature AUTHBSs and the random number RAND.

Upon receiving the authentication signature AUTHBSs and the random number RAND, the mobile station MS compares the authentication signature AUTHBSs with the internally generated authentication signature AUTHBSm in order to authenticate the network. If the two authentication signatures AUTHBSs and AUTHBSm are equivalent, the mobile station MS generates a fourth authentication signature AUTHRm using the random number RAND from the network. Thus, the mobile station MS transmits to the network the generated authentication signature AUTHRm through the Unique Challenge Response message as shown in f5 of FIG. 5. Here also, the mobile station MS may first generate the fourth authentication signature AUTHRm and then transmit the fourth authentication signature AUTHRm depending upon the results of the comparison.

Thus, the network receives the authentication signature AUTHRm from the mobile station MS through the Unique Challenge Response and compares the authentication signature AUTHRm with the internally generated authentication signature AUTHRs. If the two authentication signature AUTHRs and AUTHRm are equivalent, the authentication of the mobile station MS is successfully performed. Accordingly, the mutual authentication in which the mobile station MS authenticates the network prior to the network authentication of the mobile station MS is completed.

In the second embodiment of the mutual authentication procedure, the network may also generate the first authentication signature. In such case, the mobile station MS would generate and store the first random number RANDBS, and transmit the first random number RANDBS to the network. When the first random number RANDBS is received, the network would generate the first authentication signature utilizing the first random number RANDBS transmitted by the mobile station MS, and generate and transmits the second random number RAND with the first authentication signature to the mobile station MS. The network would next generate the second authentication signature utilizing the second random number RAND.

Thus, the mobile station MS would generate the third authentication signature utilizing the first RANDBS and compare the first authentication signature with the third authentication signature to authenticate the network. If the first and third authentication signatures are equivalent, the mobile station MS would generate the fourth authentication signature utilizing the second random number RAND and transmit the fourth authentication signature to the network.

In the above cases, the network may generate the second authentication signature prior to the transmission of the second random number RAND and the first authentication signature. Also, the mobile station MS may first generate the fourth authentication signature and then transmit the fourth authentication signature depending upon the result of the comparison.

Therefore, the network would authenticate the mobile station MS by comparing the fourth and the second authentication signatures, and if the mutual authentication is successfully performed, the network transmits the necessary parameter value(s) to the mobile station MS. Finally, the mobile station MS receives the parameter values and updates the old parameter(s). Moreover, the OTAPA procedure is carried out an analogous manner as described with respect to the first embodiment of the present invention.

In sum, a mutual authentication between a mobile station MS and a network according to the present invention can be performed within the OTAPA procedure in the related art. Thus, the present invention makes it difficult to change the mobile station operational parameter abnormally or illegally by unauthorized mobile station users. As a result, the present invention allows companies of the wireless communication network to increase legal subscription availability of mobile stations, thereby increasing the quality of service and reliability to manage networks.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of managing mobile station operational parameters in a wireless communication network comprising:

transmitting a message from a network to a mobile station to indicate an initiation of an update of the mobile station operational parameters; and updating the mobile station operational parameters after completing a mutual authentication between the mobile station and the network, wherein the mutual authentication comprises each of an authentication of the mobile station by the network and an authentication of the network by the mobile station, and wherein the mutual authentication is performed by generating at least one random number by each of the network and the mobile station.

2. The method of claim 1, wherein said message is transmitted in response to one of a user's request through the mobile station, a user's request through the network, and in response to the network during specific states of either the mobile station or the network.

3. The method of claim 1, wherein updating the mobile station operational parameters comprises:

transmitting at least one mobile station operational parameter from the network to the mobile station; and updating the at least one mobile station operational parameter stored in the mobile station.

4. The method of claim 1, wherein the mutual authentication comprises an authentication of the mobile station by the network prior to an authentication of the network by the mobile station.

5. The method of claim 1, wherein the mutual authentication comprises an authentication of the network by the mobile station prior to an authentication of the mobile station by the network.

6. The method of claim 1, wherein the network performs authentication of the mobile station by comparing a first authentication value generated by the network with a second authentication value generated by the mobile station, and wherein the mobile station performs authentication of the network by comparing a third authentication value generated by the mobile station with a fourth authentication value generated by the network.

7. The method of claim 1, further comprising generating a first authentication value using a first generated random number and generating a second authentication value using a second generated random number.

8. The method of claim 7, further comprising generating a third authentication value using the first generated random number and generating a fourth authentication value using the second generated random number.

9. The method of claim 8, wherein the first and fourth authentication values are generated by the network, and wherein the second and third authentication values are generated by the mobile station.

10. The method of claim 9, wherein the network compares the first authentication value to the second authentication value and the mobile station compares the third authentication value to the fourth authentication value to thereby perform the mutual authentication.

11. The method of claim 7, wherein the first generated random number is generated by the network and wherein the second generated random number is generated by the mobile station.

12. The method of claim 11, further comprising generating a first authentication value using a first generated random number and generating a second authentication value using a second generated random number, generating a third authentication value using the first generated random number and generating a fourth authentication value using the second generated random number, wherein the first and fourth authentication values are generated by the network, and wherein the second and third authentication values are generated by the mobile station.

13. The method of claim 12, wherein the network compares the first authentication value to the second authentication value and the mobile station compares the third authentication value to the fourth authentication value to thereby perform the mutual authentication.

14. A method of managing mobile station operational parameters in a wireless communication network, comprising:

comparing at a network a first mobile authentication signature generated by a mobile station with a first network authentication signature generated by the network;

comparing at the mobile station a second network authentication signature generated by the network with a second mobile authentication signature generated by the mobile station; and determining mutual authentication of the mobile station and the network in accordance with an outcome of the comparison at the network and the comparison at the mobile station.

15. The method of claim 14, wherein the authentication signatures are generated in accordance with at least two random numbers, a first random number being generated at the mobile station and a second random number being generated at the network.

16. The method of claim 14, further comprising generating a first random number at the network and generating a second random number at the mobile station.

17. The method of claim 16, wherein the first random number is used to generate the first network authentication signature and the first mobile station authentication signature, and wherein the second random number is used to generate the second network authentication signature and the second mobile station authentication signature.

18. The method of claim 16, wherein the first random number is used to generate the first and second network authentication signatures, and wherein the second random number is used to generate the first and second mobile station authentication signatures.

* * * * *